UNITED STATES PATENT OFFICE.

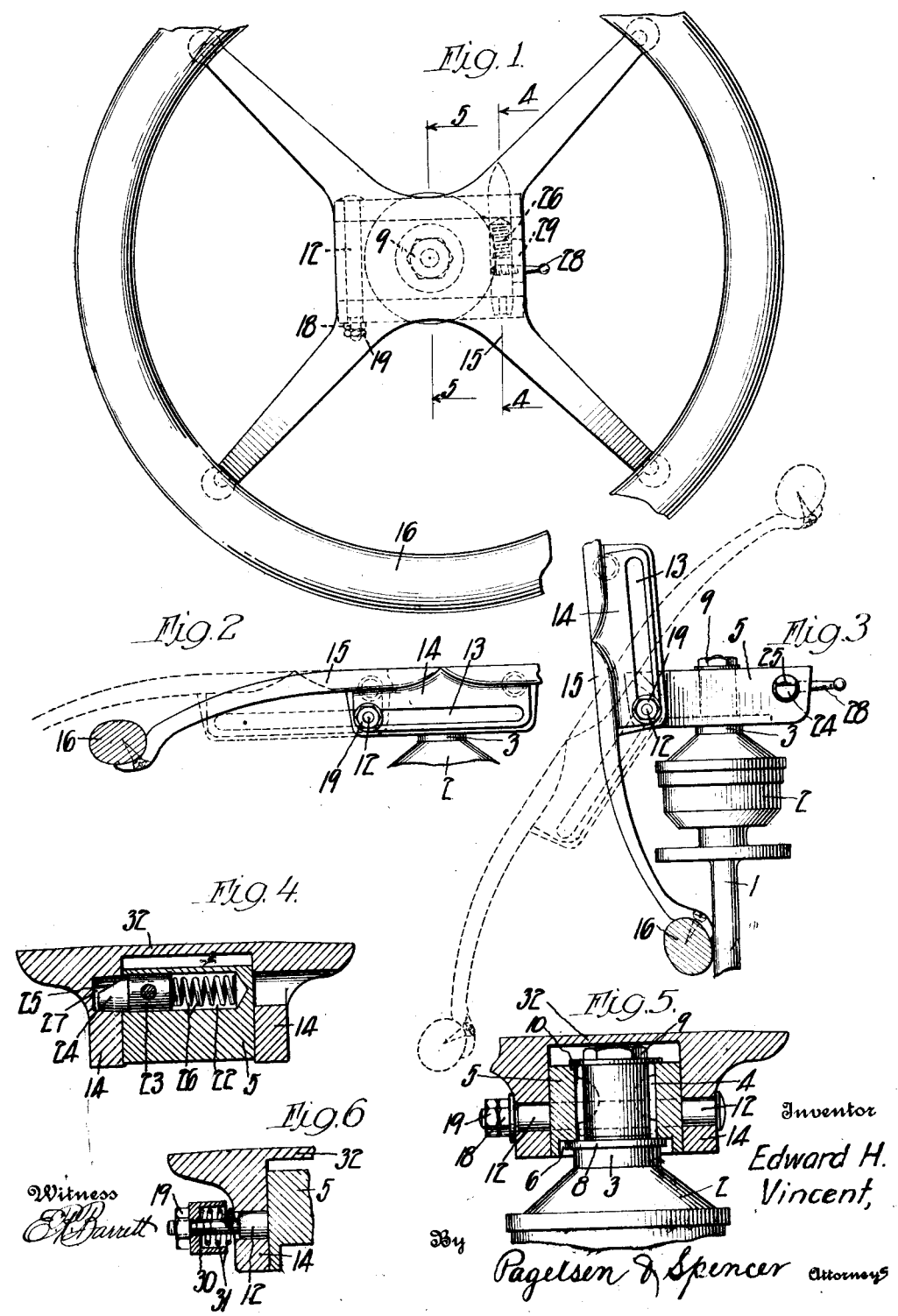

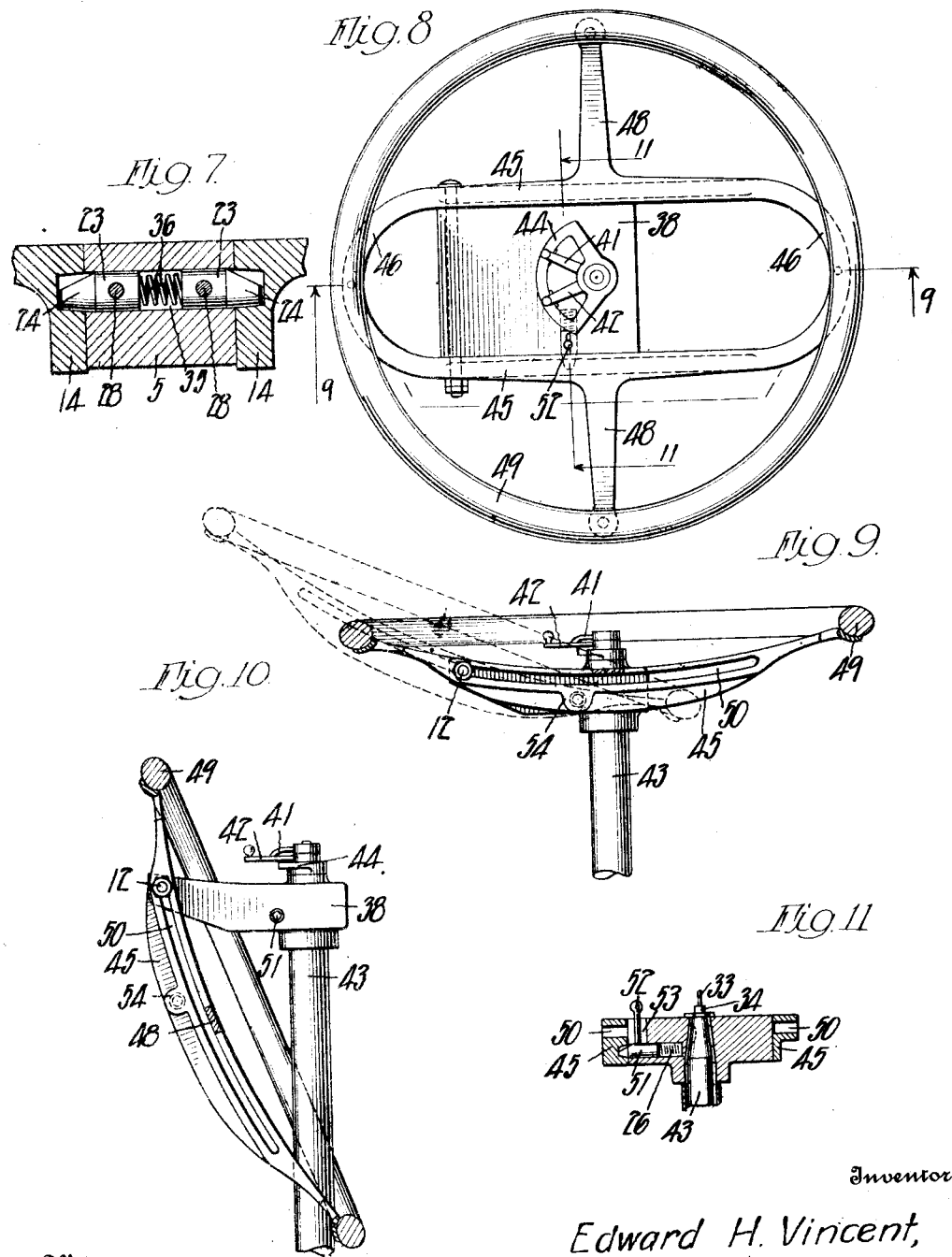

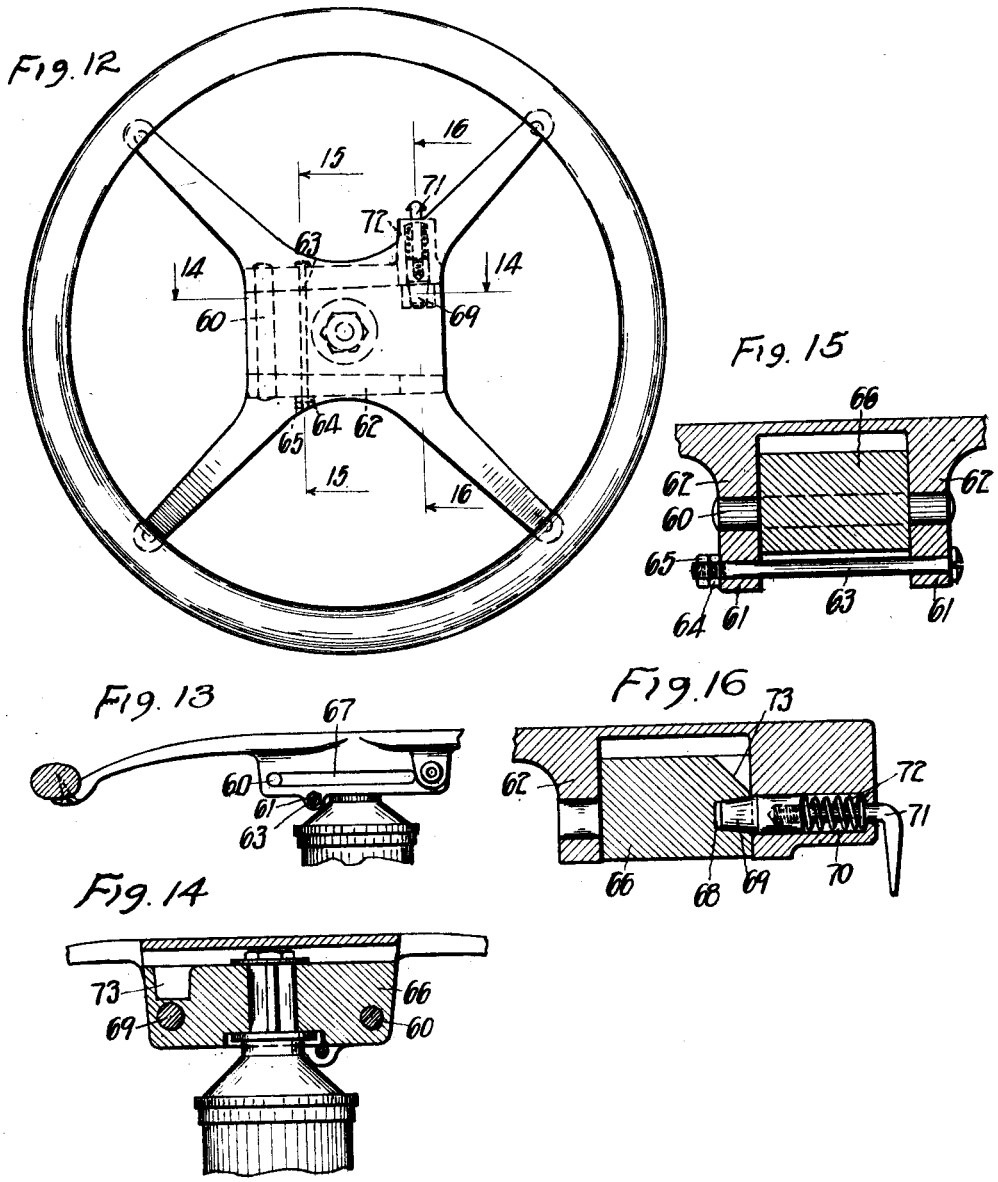

EDWARD H. VINCENT, OF DETROIT, MICHIGAN.

SHIFTABLE STEERING-WHEEL.

1,186,957.　　　Specification of Letters Patent.　　Patented June 13, 1916.

Application filed October 2, 1915. Serial No. 53,683.

*To all whom it may concern:*

Be it known that I, EDWARD H. VINCENT, a citizen of the United States, residing at Detroit, in the county of Wayne and State of Michigan, have invented a new and useful Shiftable Steering-Wheel, of which the following is a specification.

The object of the present invention is to provide a shiftable steering wheel for motor vehicles in which an unusual amount of clearance both in respect to the driver and to the wind shield or other element forward of the steering post is obtained.

Among its important features are means whereby both sliding and swinging movements may be imparted to the wheel, either simultaneously or successively, the sliding movement being transversely across the post and the swinging movement taking place about an axis at right angles thereto; means whereby the degree of frictional engagement between the wheel and its support may be determined and maintained; and means whereby the wheel may be locked in steering position. These features are also coupled, in certain instances, with means whereby the side of the wheel adjacent the driver may be swung either downwardly into contact with the post or upwardly over the head of the post; also, with means for causing the sliding movement to take place in a curved line, thus elevating the forward side of the wheel rapidly and avoiding contact with the wind shield.

The invention further consists in the details of construction shown, described and claimed.

In the drawings, Figure 1 is a plan view, parts being broken away, showing one embodiment of the invention. Figs. 2 and 3 are fragmentary side views corresponding thereto, the wheel being shown in various positions and the rim appearing in section. Figs. 4 and 5 are sections on the lines 4—4 and 5—5, respectively, of Fig. 1. Fig. 6 is a fragmentary section corresponding to Fig. 5 showing a modification. Fig. 7 is a fragmentary section corresponding to Fig. 4 showing a further modification. Fig. 8 is a plan view of another embodiment of the invention. Figs. 9 and 10 are sections on the line 9—9 of Fig. 8, showing the wheel in several positions. Fig. 11 is a fragmentary section on the line 11—11 of Fig. 8. Fig. 12 is a plan view of a further modification. Fig. 13 is a fragmentary side view thereof, and Figs. 14, 15 and 16 are sections on the lines 14—14, 15—15 and 16—16 of Fig. 12.

Similar reference characters refer to like parts throughout the several views.

Referring particularly to Figs. 1 to 4, inclusive, 1 indicates a steering rod which may be provided with a gear box 2 containing reduction gearing (not shown). The upper end 3 of the rod is slotted to receive keys 4 by means of which a substantially rectangular head 5 is coupled thereto for turning movement; and the lower side of the head is preferably bored out at 6 and rests upon a flange 8 on the gear box, although it may be supported otherwise. A nut 9 having a collar or flange 10 securely clamps the head in position. The lower portion of the rod may be inclosed in a hollow post in the usual manner.

Extending crosswise of the head at a point considerably removed from the axis of the rod is a pivot bolt 12, the outwardly projecting ends of which are received in the slots 13 formed in the relatively thin flanges 14 of the spider 15 to the ends of the arms of which the rim 16 is attached in any suitable way. When in steering position (full lines, Fig. 2), these slots extend transversely in respect to the rod, that is, at an angle, preferably 90°, to the axis of the latter. The threaded end of the pivot bolt may be reduced, if desired, and receives a nut 18 and lock nut 19 whereby the degree of frictional engagement between the flanges 14 and sides of the head is determined and maintained. It will be seen that the area of contact between the flanges and the head is of considerable extent. The head is reamed out at 22, preferably on the side of the center line of the rod opposite to the pivot, to receive a latch-bolt having a cylindrical body 23 terminating in a conical or tapering outer end 24, the upper surface 25 of which is milled to a rather sharp angle with the axis of the body; and a spring 26 tends to thrust the end of the bolt (when the wheel is in steering position) into a socket 27 formed in one of the flanges 14. A finger-grip 28, threaded into the latch-bolt and passing out rearwardly through a slot 29, affords a convenient means for withdrawing the latch to release the wheel.

When the wheel is released, it may be slid at right angles to the post into the position indicated in dashed lines in Fig. 2, after which it may be tilted as shown in dashed lines in Fig. 3, or it may be merely tilted (without sliding) into the full line position, Fig. 3. It may also be given a simultaneous tilting and sliding movement, the capacity for which is particularly important in those cases wherein little clearance is provided between the wind shield and the wheel. The inclination of the surface 25 is preferably such as to cause the latch-bolt to be automatically thrust back into the head as the wheel is swung back into steering position.

In lieu of the nuts 18, the bolt 12 may be provided with a hollow nut 30 (Fig. 6) that incloses a compression spring 31, the inner end of which bears against the flange 14. The nut 30 and lock nut 19 being properly adjusted, it follows that a constant predetermined pressure will be exerted on the flanges 14 and that this pressure may be made sufficient to establish a close frictional engagement between the flanges and head, whereby the wheel may be held in any position and wear may be automatically taken up.

The flanges 14 of the spider may be joined by a web 32 (Figs. 4, 5 and 6) that passes over the upper end of the post, or the web may be omitted (Fig. 7) to allow passage of the spark and throttle controlling rods 33 and 34 (as shown in Fig. 11) or like mechanism. The latch-bolt 23—24 in this case is preferably replaced by a pair of similar latches located in a common guide-way 35, a single spring 36 sufficing to thrust them out into the sockets.

In the embodiment of the invention indicated in Figs. 8 to 11, inclusive, the head 38 is larger than that heretofore shown, and the rods 33 and 34 for the spark and throttle control levers 41 and 42 pass up through it from the steering rod 43 in an obvious manner, the levers being arranged to sweep over an arc 44. The spider is formed of a pair of parallel bars 45 preferably integral, (the ends of which may be curved at 46) and the laterally projecting spokes 48 upon which the rim 49 is supported; and the bars are provided with slots 50 preferably struck on an arc about a point above the wheel and in alinement with the rod 43. The latch-bolt 51 (similar to the bolt 23—24) is, in this instance, preferably located below the slots and forward of the steering rod and may be withdrawn by the finger grip 52 which projects upwardly through a slot 53 in the head. A spring 26 thrusts the bolt, when the wheel is in steering position, into a socket formed in a boss 54 on one of the bars 45.

In use, the latch may be withdrawn and the wheel dropped clockwise about the pivot until the rim strikes the rod (Fig. 10); it may be slid transversely and tilted counter-clockwise about the pivot (Fig. 9) in a manner similar to that indicated in Fig. 3; or by turning the wheel clockwise slightly (Fig. 9) until the groove 50 alines with the latch-pin and thereupon allowing the latter to snap out into the groove, the wheel may be slid transversely in an arc, in which case the forward edge rises rapidly—an action that is accentuated by locating the latch-bolt relatively low on the head 38—to afford clearance past the wind shield (not shown).

The modification shown in Figs. 12 to 16 differs from those heretofore described in two particulars:—The pivot bolt 60 in this case has no function otherwise than as a pivot, perforated lugs 61 being formed on the lower surfaces of the flanges 62 of the spider, and a cross bolt 63, adjusting nut 64 and lock nut 65 serving to establish and insure the proper frictional engagement between the wheel and the head 66. Lying intermediate the ends of the slots 67 (that correspond to the slots 13 or 50 as the case may be), the cross bolt 63 gives rise to a more uniform distribution of pressure between the wheel and head than is attained in the constructions heretofore described. Another point of difference between this embodiment and those shown in Figs. 1 to 11 is in the locking mechanism. The head in this instance has a socket 68 (Fig. 16) formed in one side to receive the tapered head 69 of a latch bolt, the body of which fits closely to the guide 70 in the spider. A hand grip 71 that is threaded into the latch bolt serves as a convenient means for withdrawing the latter and a spring 72 tends to thrust it into the locking position indicated in Fig. 16. For the purpose of forcing the latch bolt back to allow an automatic locking action as the wheel is swung into steering position, the head is provided with an inclined striker surface 73 against which the end of the latch bolt strikes. It is preferable also to taper the head and flanges slightly so that they diverge from each other rearwardly from the pivot, as shown in Fig. 12, whereby looseness on account of wear is largely avoided.

Many changes may obviously be made in the details of construction without departing from the spirit of my invention; and although the device is especially adapted to pleasure cars, it may be used on any other self-propelled vehicle or on motor boats. I do not, therefore, wish to be limited otherwise than as indicated by the subjoined claims.

I claim:—

1. In combination, a steering rod for a motor vehicle, a head attached to the upper end of the rod, a steering wheel supported on the head, means whereby said wheel is allowed both a sliding motion transversely in respect to the steering rod and a tilting motion about a pivot below the upper level of the wheel, and means for locking said wheel in steering position upon the head.

2. In combination, a steering rod for a motor vehicle, a head attached to the upper end of the rod, a steering wheel supported on the head, means whereby said wheel is allowed both a sliding motion transversely in respect to the steering rod and a tilting motion about a pivot below the upper level of the wheel, and means for establishing a predetermined degree of frictional engagement between the head and wheel whereby resistance is offered to the movement of the latter.

3. In combination, a hollow steering rod for a motor vehicle, a head attached to the upper end of the rod, engine control mechanism passing up through the rod and projecting from its upper end, a steering wheel, said head and wheel constituting two members, said members having coöperating pivot means whereby the wheel is allowed both a sliding and a swinging movement in respect to the head.

4. In combination, a steering rod for a motor vehicle, a head attached to the upper end of the rod, a steering wheel supported on the head, pivot means carried by the head, said wheel having means coöperating with said pivot means, whereby the wheel is allowed both a sliding and swinging movement about the pivot means, and means for locking said wheel in steering position upon the head and against movement longitudinally of the steering rod in both directions.

5. In combination, a steering rod for a motor vehicle, a head attached to the upper end of the rod, a steering wheel supported on the head, pivot means carried by the head, said wheel having means coöperating with said pivot means, whereby the wheel is allowed both a sliding and swinging movement about the pivot means, means for locking said wheel in steering position upon the head, and means for establishing a frictional engagement between the head and wheel whereby resistance to the movement of the latter may be varied at will.

6. In combination, a steering rod for a motor vehicle, a head attached to the upper end of the rod, a steering wheel supported on the head, pivot means carried by the head, said wheel having means coöperating with said pivot means whereby the wheel is simultaneously allowed both a sliding movement transversely of the head and a swinging movement about the pivot means to afford clearance between the forward side of the wheel and an object in front of it.

7. In combination, a steering rod for a motor vehicle, a head supported on the upper end of the rod, a steering wheel supported on the head, a pivot bolt projecting from the head, said wheel including a slot through which the pivot bolt passes, and a nut on the bolt for clamping the head and wheel together and insuring friction between the head and the wheel, the whole arrangement being such that the wheel may be slid laterally on the rod and swung angularly about the pivot.

8. In combination, a steering rod for a motor vehicle, a head supported on the upper end of the rod, a steering wheel supported on the head, pivot means projecting from the upper end of the head, said wheel including a slot through which the pivot means passes, and means coöperating with the pivot means for clamping the head and wheel together with a desired degree of frictional engagement.

9. In combination, a steering rod for a motor vehicle, a head supported on the upper end of the rod, a steering wheel supported on the head, a pivot bolt projecting from the head, said wheel including a slot through which the pivot bolt passes, a nut on the bolt for clamping the head and wheel together and insuring friction between the head and the wheel, and means for locking the nut in position, the whole arrangement being such that the wheel may be slid laterally on the rod and swung angularly about the pivot.

10. In combination, a hollow steering rod for a motor vehicle, a head attached to the upper end of the rod, engine control mechanism passing up through the rod and projecting from its upper end, a steering wheel supported on the head, means whereby said wheel is allowed both a sliding motion transversely in respect to the steering rod and a swinging motion about a pivot below the upper level of the wheel, and means for locking said wheel in steering position upon the head.

11. In combination, a hollow steering rod for a motor vehicle, a head attached to the upper end of the rod, engine control mechanism passing up through the rod and projecting from its upper end, a steering wheel, pivot means carried by the head, said wheel having means coöperating with said pivot means, whereby the wheel is allowed both a sliding and swinging movement about the pivot means.

12. In combination, a hollow steering rod for a motor vehicle, a head attached to the upper end of the rod, engine control mechanism passing up through the rod and projecting from its upper end, a steering wheel, pivot means carried by the head, said wheel having means coöperating with said pivot means, whereby the wheel is allowed both a sliding and swinging movement about the pivot means, and means for locking said wheel in steering position upon the head.

13. In combination, a hollow steering rod for a motor vehicle, a head attached to the upper end of the rod, engine control mechanism passing up through the rod and projecting from its upper end, a steering wheel, pivot means carried by the head, said wheel having means coöperating with said pivot means, whereby the wheel is allowed both a sliding and swinging movement about the pivot means without interference with said control mechanism.

14. In combination, a hollow steering rod for a motor vehicle, a head attached to the upper end of the rod, engine control mechanism passing up through the rod and projecting from its upper end, a steering wheel, means whereby said wheel is allowed both a sliding motion transversely in respect to the steering rod and a tilting motion about a pivot below the upper level of the wheel without interference with said control mechanism, and means for locking said wheel in steering position upon the head.

15. In combination, a steering rod for a motor vehicle, a head attached to the upper end of the rod, a steering wheel supported on the head, means whereby said wheel is allowed both a curved sliding motion transversely in respect to the steering rod and a tilting motion about a pivot below the upper level of the wheel, and means for locking said wheel in steering position upon the head and against movement longitudinally of the steering rod in both directions.

16. In combination, a steering rod for a motor vehicle, a head supported on the upper end of the rod, a steering wheel supported on the head, pivot means about which the wheel may be tilted in respect to the head, the axis of said pivot means being at right angles to the axis of the rod and being offset laterally from the latter, said wheel including means whereby the wheel is also allowed a sliding motion in respect to the axis of the pivot means and against movement longitudinally of the steering rod in both directions.

17. In combination, a steering rod for a motor vehicle, a head supported on the upper end of the rod, a steering wheel supported on the head, pivot means about which the wheel may be tilted in respect to the head, the axis of said pivot means being at right angles to the axis of the rod and being offset laterally from the latter, said wheel including means whereby the wheel is also allowed a sliding motion in respect to the axis of the pivot means, and means for establishing a desired degree of frictional engagement between the head and the wheel whereby resistance is offered to the sliding movement of the latter.

18. In combination, a steering rod for a motor vehicle, a head supported on the upper end of the rod, a steering wheel supported on the head, pivot means about which the wheel may be tilted in respect to the head, the axis of said pivot means being at right angles to the axis of the rod and being offset laterally from the latter, said wheel including means whereby the wheel is also allowed a sliding motion in respect to the axis of the pivot means, and means for locking the wheel in steering position and against movement longitudinally of the steering rod in both directions.

19. In combination, a steering rod for a motor vehicle, a head supported on the upper end of the rod, a steering wheel supported on the head, means whereby said wheel is allowed both a sliding motion transversely in respect to the rod and a tilting motion about a pivotal axis below the upper level of the wheel, and means for automatically locking said wheel in steering position on the head and against movement longitudinally of the steering rod in both directions.

20. In combination, a steering rod for a motor vehicle, a head supported on the upper end of the rod, a steering wheel supported on the head, said head and wheel constituting two members, a pivot carried by one of the members, the other member having a slot through which the pivot projects, means for establishing a predetermined degree of frictional engagement between the members, and means for positively locking them together in steering position.

21. In combination, a steering rod for a motor vehicle, a head supported on the upper end of the rod, a steering wheel supported on the head, said head and wheel constituting two members, a pivot carried by one of the members, the other member having a slot through which the pivot projects, and means for locking them together in steering position, said locking means comprising a latch member located below the slot when the wheel is in steering position, and said last mentioned member being arranged to be projected into the slot when the rear side of the wheel is lowered, to form, together with the pivot, a guide for lateral sliding movement of the wheel in respect to the rod.

22. In combination, a steering rod for a motor vehicle, a head supported on the upper end of the rod, a steering wheel supported on the head, said head and wheel constituting two members, a pivot carried by one of the members, the other member having a slot through which the pivot projects, said slot being curved and having its concave side upward, and means for locking them together in steering position, said locking means comprising a latch member located below the slot when the wheel is in steering position, and said last mentioned member being arranged to be projected into the slot when the rear side of the wheel is lowered, to form, together with the pivot, a guide for lateral sliding movement of the wheel in respect to the rod, whereby the forward side of the wheel is caused to rise during the sliding movement.

23. In combination, a steering rod for a motor vehicle, a head supported on the upper end of the rod, a steering wheel supported on the head, means whereby said wheel is allowed both a sliding motion transversely in respect to the rod and a tilting motion about a pivotal axis below the upper level of the wheel, and means for locking said wheel in steering position on the head and against movement longitudinally of the steering rod, in both directions.

In testimony whereof I sign this specification.

EDWARD H. VINCENT.